Figure 3:
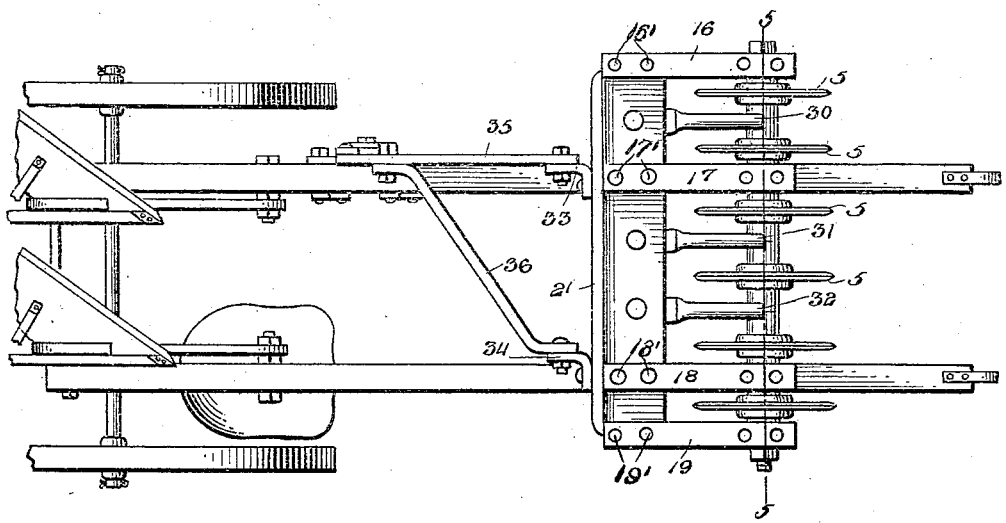

C. HIGHTOWER.
COLTER ATTACHMENT FOR PLOWS.
APPLICATION FILED NOV. 18, 1907.
941,252.
Patented Nov. 23, 1909.
4 SHEETS—SHEET 1.
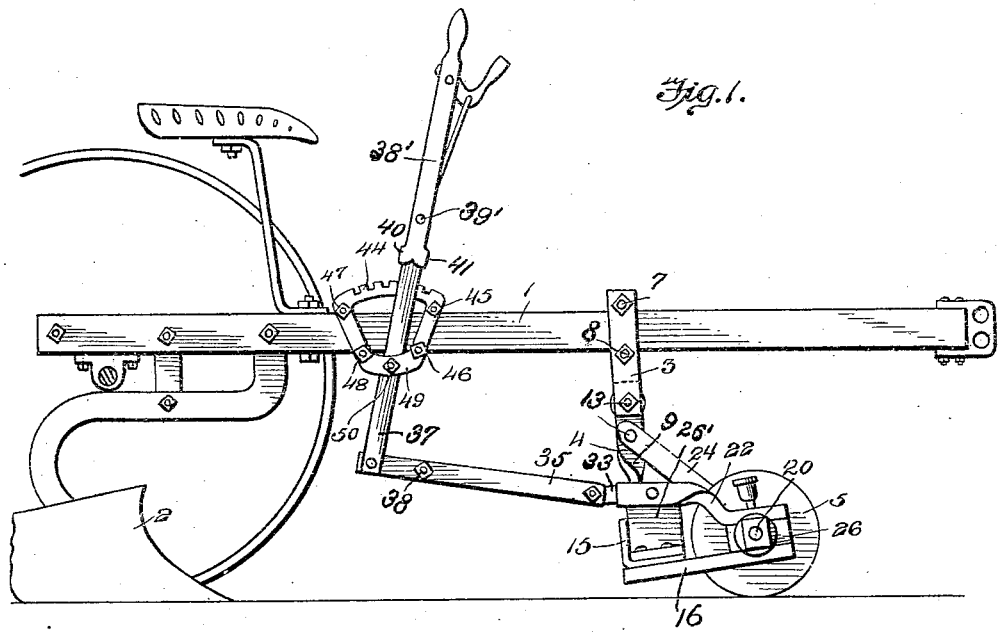
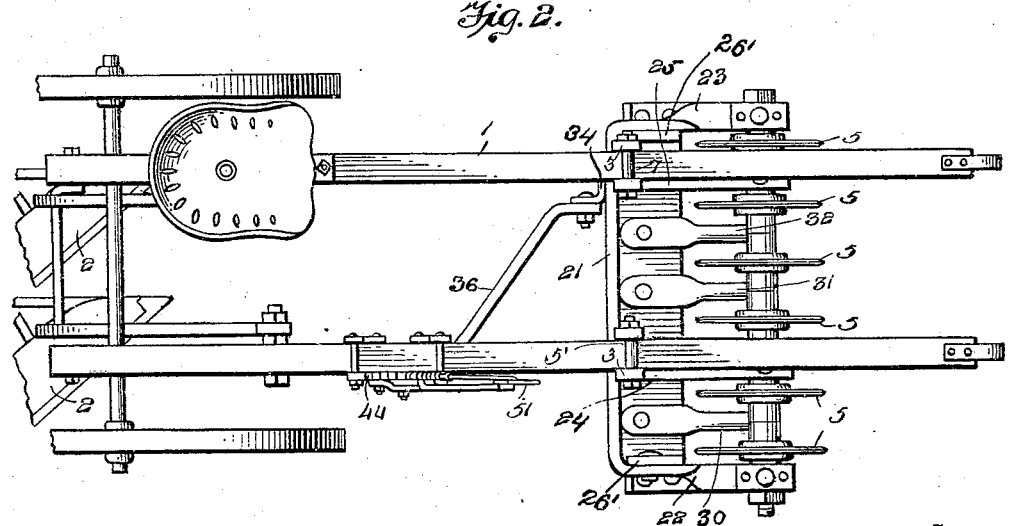
Witnesses
G. M. Spring.
A. S. Kitchin.
Inventor
Corrie Hightower
By Mason Fenwick & Lawrence
his Attorneys

C. HIGHTOWER.
COLTER ATTACHMENT FOR PLOWS.
APPLICATION FILED NOV. 13, 1907.

941,252.

Patented Nov. 23, 1909.
4 SHEETS—SHEET 2.

Witnesses
G. M. Spring.
A. S. Kitchin.

Inventor
Corrie Hightower
By Mason Fenwick & Lawrence.
his Attorneys

C. HIGHTOWER.
COLTER ATTACHMENT FOR PLOWS.
APPLICATION FILED NOV. 18, 1907.
941,252.
Patented Nov. 23, 1909.
4 SHEETS—SHEET 3.
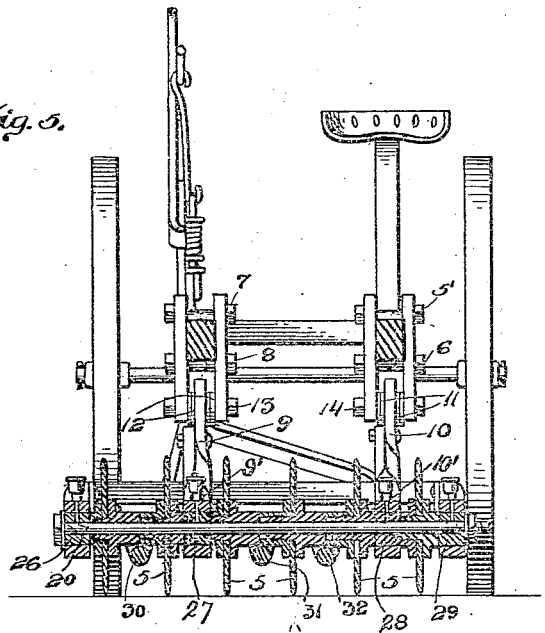
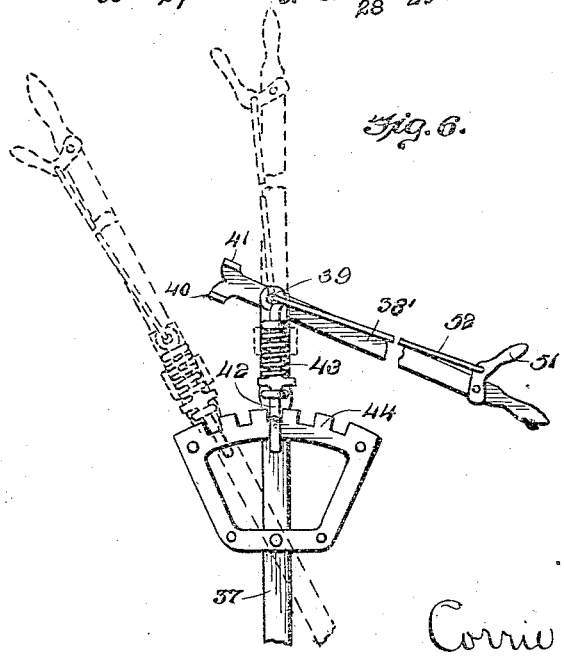
Witnesses
G. M. Spring.
D. J. Kitchin.
Inventor
Corrie Hightower
By Mason Fenwick Lawrence,
his Attorneys

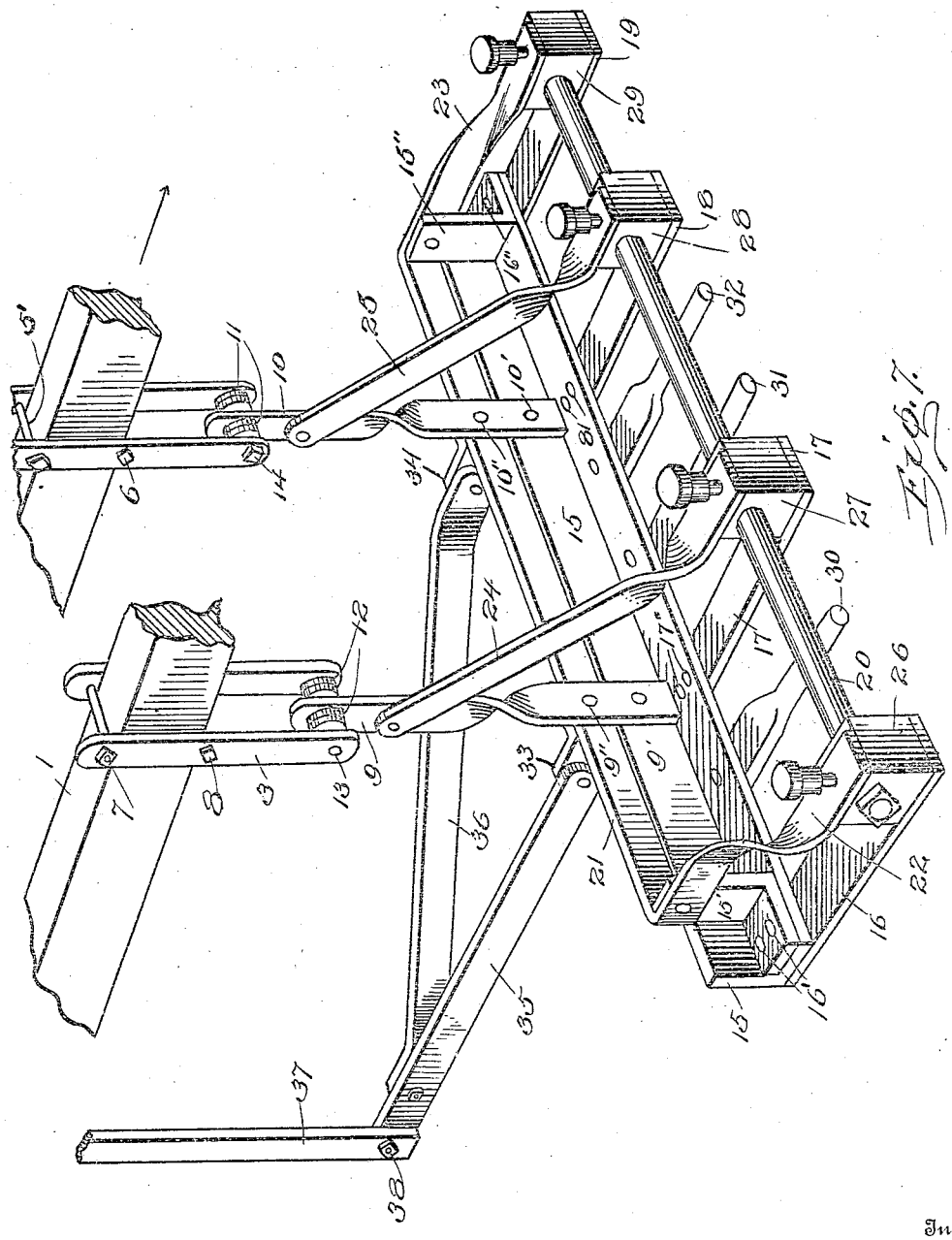

UNITED STATES PATENT OFFICE.

CORRIE HIGHTOWER, OF HUNTSVILLE, ILLINOIS, ASSIGNOR OF ONE-HALF TO MARTIN L. RYAN, OF RUSHVILLE, ILLINOIS.

COLTER ATTACHMENT FOR PLOWS.

941,252.  Specification of Letters Patent.  Patented Nov. 23, 1909.

Application filed November 18, 1907. Serial No. 402,762.

*To all whom it may concern:*

Be it known that I, CORRIE HIGHTOWER, a citizen of the United States, residing at Huntsville, in the county of Schuyler and State of Illinois, have invented certain new and useful Improvements in Colter Attachments for Plows; and I do hereby declare the following to be a full, clear, and exact description of the invention, such as will enable others skilled in the art to which it appertains to make and use the same.

This invention relates to improvements in attachments for plows, and particularly to colters designed to be used in connection with any desired kind of plow for cutting or dividing the ground in front of the plow.

The invention comprises the production of an attachment that may be secured to any desired plow, and also arranged so as to be raised and lowered for being thrown into and out of operation as occasion may require.

The invention further comprises the production of a framework that is designed to be removably secured to a frame of a plow, either walking or riding plow, and a plurality of disk colters mounted in the framework so as to revolve as the plow is drawn across the field, in order to divide the earth in the usual manner of colters.

The invention further comprises the production of a colter in which a plurality of disks are mounted upon a shaft at any preferred distance apart, together with clamping members that are designed to hold the disks spaced apart, and for also firmly holding the disk in position upon the shaft so that the same may rotate with the disk in a suitable framework.

The invention still further comprises a pivotally mounted framework carrying colter disks, and a lever for raising and lowering the same, the lever being designed to be broken or pivotally mounted in order to be moved out of the way of other mechanism.

An object in view is the production of a colter in which a plurality of disks are provided spaced any suitable distance apart and designed to be secured in a pivotally mounted frame for easy manipulation.

Another object in view is a provision of colters formed with a plurality of disks mounted in a frame that is removably secured to a plow and also arranged so as to be adjusted laterally thereof in order to provide proper draft for the colter and plow.

With these and other objects in view the invention comprises certain novel constructions, combinations and arrangements of parts, that will be hereinafter more fully described in the claims.

Figure 4:
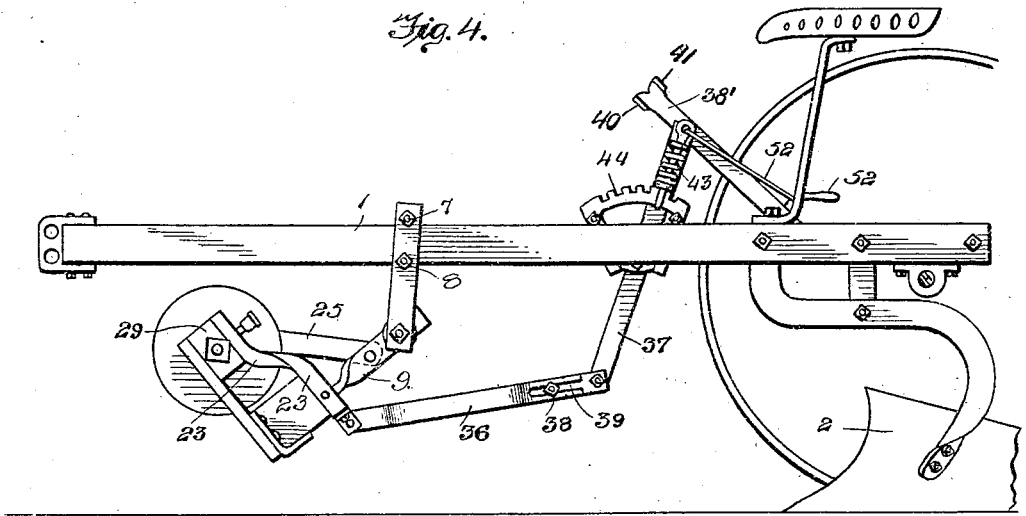

In the accompanying drawings:—Figure 1 is a side elevation of my invention secured to a wheel plow of any desired type. Fig. 2 is a top plan view of Fig. 1. Fig. 3 is a bottom plan view of Fig. 1. Fig. 4 is a side elevation of my improved device secured to a plow looking at the same from the opposite side to the side shown in Fig. 1. Fig. 5 is a section through Fig. 3 on line 5—5. Fig. 6 is an enlarged detail fragmentary view of an improved lever forming part of the present invention. Fig. 7 is a fragmentary perspective view of the colter attachment, certain parts being removed.

In colters it is usual to secure the same to a plow in front of the breaking part of the plow or plow share, so as to obviate the necessity of the plow share breaking or cracking the earth along a particular line, and by this means permits the plow to be drawn through the earth with less power. Various means have been provided for adjusting the colters and for securing the same in position with varying results for accomplishing the advantages desired. In the present invention these results are designed to be accomplished, namely, the cutting or breaking of the earth in front of the plow proper, so as to permit the same to easily pass through the earth and to provide a colter that may be easily and quickly adjusted to suit varying conditions.

Referring more particularly to the drawings, 1 indicates a plow frame of any preferred or usual kind, and 2 the plow share or plow proper. Mounted upon frame 1 are stationary frames 3 and pivotally mounted upon stationary frames 3 is another frame 4 which is designed to carry any desired number of disks 5. Frames 3 are formed by parallel bars clamped in place by bolts 5' and 6 and 7 and 8 to frame 1. Frames 3 may be secured to frame 1 of the plow in any desired way, but preferably I secure the same in place by bolting the same to frame 1 by bolts 5', 6, 7 and 8, as clearly seen in Fig. 5. By thus securing the frames 3 in position, it will be seen that the lower ends thereof are spaced a distance apart and are therefore in condition for accommodating pivotally mounted arms 9 and 10, together with washers 11 and 12. Ordinarily washers 11 and 12 are evenly divided and positioned on each side of members 9 and 10, as seen in Fig. 5, but if it is desired to move the pivotally mounted frame 4 one way or the other laterally of the plow frame 1 the washers are all placed upon one side, or partially so, as may be desired. By this means a lateral adjustment is provided for the distance of the thickness of the washers 11 and 12, which in ordinary practice would be approximately three inches. As the disks 5 are designed to be spaced usually four inches apart, a side movement of the frame for three inches would be ample for all possible contingencies.

In order to hold pivotally mounted members 9 and 10 in position, I provide pivotal shafts 13 and 14 made on the order of bolts, so as to be easily removed or inserted. The pivotally mounted bars or members 9 and 10 extend downward and are secured by any desired means as bolts 9′ and 10′ respectively to a cross member 15, which is preferably constructed in the form of an angle iron. To the angle iron or member 15 are rigidly secured arms 16, 17, 18 and 19, by any desired means as bolts 16′, 17′, 18′ and 19′, these arms being adapted to support a bearing shaft 20 that carries the disks 5. A cross-bar 21 is rigidly secured to pivotally mounted arms or members 9 and 10 by bolts 9″ and 10″ and extends to opposite the ends of bar 15, and is then bent over and formed into bracing members 22 and 23 as clearly seen in Figs. 1 and 2. Brackets 15′ and 15″ are secured to bar 15 by bolts 16′ and 16″ respectively. The brackets 15′ and 15″ are also connected with bar 21 for supporting and bracing the same correctly in position, and for forming connecting means between bar 21 and bar 15. By this structure the arms or members 16 and 19 are supported in correct position for holding the disks 5 in their correct position. In order to rigidly hold disks 5 in position during operation, arms 17 and 18 have secured thereto bracing members 24 and 25 that are in turn secured to bars 9 and 10. In order to provide a smooth bearing for shaft 20, bearing blocks 26, 27, 28 and 29 are provided that are designed to be positioned between arms 16, 17, 18 and 19 and their respective braces 22, 24, 25 and 23. In addition to the bearing boxes there is provided an oil cup for each bearing box or block, as clearly seen in Fig. 5 so that any desired kind of oil may be used in lubricating the journal shaft 20. Rigidly secured to member or angle bar 15 are a plurality of fingers 30, 31 and 32 that are designed to prevent dirt or trash from clogging, or in any way hindering the operation of the disks. It will be seen that these fingers, together with arms 24 and 25 pass between the disks and consequently are in a position for warding off anything that tends to get in between the disks.

Rigidly secured to cross-bar 21 are brackets or members 33 and 34. Pivotally secured to the brackets 33 and 34 are arms or members 35 and 36 that are designed to be operated by a lever 37 for raising and lowering the movable frame 4 and the disks carried thereby. As clearly seen in Fig. 3, arm 35 is secured to bracket 33 and has secured thereto at the opposite end arm 36 and is pivotally secured to lever 37 so that any movement of lever 37 will be communicated to arm 35 and from thence to the movable frame 4. Arm 36 is designed to be adjustably secured to arm 35 by any suitable means as bolt 38 which passes through a slot 39 in the end of the same. This is provided in order that the angle of the disks 5 may be regulated so that the same may point directly toward the front and in line with the frame 1 or at a slight angle thereto. Before adjusting the arm 36, frame bolt connections 5, 6, 7, and 8 are loosened, and when the proper angle of adjustment is secured by means of this regulating arm 36, the bolt connections are again rigidly tightened. As the arm or member 36 is moved until the inner end of the slot 36 engages bolt 38, the frame 4 will be turned or moved to an angle to the draft, and as the arm 36 is moved until bolt 38 engages the extreme outer end of slot 39 the disks will be moved to a different angle. By this construction and arrangement, disks 5 may be given any angle desired, either toward the right or left, as the case may be, so as to cause the same to operate properly and to cause the cutters themselves and the plow to pass through the earth without substantially any side draft.

In operation the stationary frame 3 is securely fastened to the frame 1 in front of plow 2 and then by means of lever 37 the movable frame 4 is moved from the position shown in Fig. 4 to substantially the position shown in Fig. 1. When in this position disks 5 will enter the earth at the same time as plow 2 and will remain in the earth until lever 37 is operated for again raising the same. Preferably I provide disks positioned four inches apart so that there will be three disks for every twelve inches plow, but it will be evident that more or less disks may be used according to the condition and character of the earth being plowed. By providing a plurality of disks in the front of each plow the earth is broken or cut into small strips and as the plow follows, the same will have but little work in turning over the earth. By the provision of a pivotally mounted frame as 4, and means for operating the same at any time, a structure is provided that permits the plow to turn a square corner at the end of the row as the disks may be removed from the earth during the turning period, or the disks may be removed when it is desirable to move the plow from one place to another.

In providing lever 37 for operating the movable frame 4 I preferably construct the same as shown in Fig. 6. Lever 37 is provided with an arm or extension 38' that is pivotally mounted at 39' to lever 37. On one end of arm 38 are formed ears 40 and 41 which are designed to span and in a certain sense clasp the upper end of lever 37 as seen in Figs. 1 and 5, and also at dotted lines in Fig. 6. Positioned near the upper end of lever 37 is a catch 42 and a spring 43 for normally holding the catch in engagement with a segmental rack 44. The segmental rack 44 is designed to be rigidly secured to a frame 1 by any suitable means, preferably bolts 45, 46, 47 and 48. Bolts 46 and 48 also pass through and hold in position a journal member 49 that is designed to accommodate a shaft or bolt 50. The shaft or bolt 50 passes through the lower part of rack 44, and lever 37 or bearing member 49. By this construction lever 37 is pivotally mounted upon said segmental rack 44 and is held in proper position by catch 42 to properly engage the notches in the rack. Catch 42 is connected to an operating lever or member 51 by a rod or link 52. When it is desired to operate lever 37, arm 38 is brought over to a position that is a continuation of lever 37, as seen in Fig. 1 and in dotted lines in Fig. 6 and members 40 and 41 engage the edges of lever 37. When in this position lever 51 may be operated for moving catch 42 out of the notches and rack 44 and when so removed lever 37 may be moved in either direction as desired, ears 40 and 41 causing any pressure brought to bear upon arm 38, to be transmitted to lever 37. It will be observed that arm 38 is loosely pivoted at point 39 so that lugs 40 and 41 may have a lateral movement for permitting disengagement with lever 37 and for again engaging the same. As lever 37 has been moved to the position desired, arm 38 may be moved or pivoted laterally for permitting lugs 40 and 41 to disengage the lever, and when so disengaged the arm 38 may be moved over into position shown in Figs. 4 and 6 out of the way of the remaining mechanism.

What I claim is:—

1. In a plow attachment, a colter carrying frame adjustably suspended, a series of colters revolubly mounted in said frame, a shaft for supporting said colters journaled to said frame, journal boxes for said shaft, and a series of arms projecting against the lower side of said journal boxes.

2. In a plow attachment, a plurality of revolving disks, an axle therefor, end bars supporting said axle, a cross bar uniting said end bars, arms connected with said cross bar, a plurality of brackets movably mounted upon the frame of said plow and connected with said arms, a plurality of braces connecting said arms and said axle, rearwardly extending bars movably connected with said cross bar, an operating lever pivotally connected to said rearwardly extending bars.

3. In a plow attachment, a centrally positioned axle, a plurality of revolving disks mounted upon said axle, a frame work comprising end and cross bars rigidly supporting said axle, lubricating means for said axle, upwardly extending connections, a plurality of brackets movably mounted upon the plow frame, pivotal connections between the said brackets and said upwardly extending connections, and a rearwardly located lever mounted upon the plow frame provided with means for adjustably swinging said disks into and out of operative position.

In testimony whereof I affix my signature in presence of two witnesses.

CORRIE HIGHTOWER.

Witnesses:
J. T. BARTLOW,
E. J. RYAN.